(12) United States Patent
Ji et al.

(10) Patent No.: US 10,175,793 B2
(45) Date of Patent: Jan. 8, 2019

(54) TOUCH DISPLAY PANEL, DRIVING CIRCUIT AND DRIVING METHOD OF TOUCH DISPLAY PANEL

(71) Applicant: Wuhan China Star Optoelectronics Technology Co., Ltd., Wuhan, Hubei (CN)

(72) Inventors: Feilin Ji, Guangdong (CN); Jinjie Zhou, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 179 days.

(21) Appl. No.: 15/118,868

(22) PCT Filed: Jul. 21, 2016

(86) PCT No.: PCT/CN2016/090896
§ 371 (c)(1),
(2) Date: Aug. 13, 2016

(87) PCT Pub. No.: WO2018/010204
PCT Pub. Date: Jan. 18, 2018

(65) Prior Publication Data
US 2018/0164929 A1  Jun. 14, 2018

(30) Foreign Application Priority Data
Jul. 11, 2016 (CN) .......................... 2016 1 0541395

(51) Int. Cl.
*G06F 3/041* (2006.01)

(52) U.S. Cl.
CPC .......... *G06F 3/0412* (2013.01); *G06F 3/0416* (2013.01)

(58) Field of Classification Search
CPC ............................ G06F 3/0412; G06F 3/0416
USPC .................................................. 345/156–184
See application file for complete search history.

(56) References Cited

U.S. PATENT DOCUMENTS

| 6,501,672 | B1 * | 12/2002 | Sekiguchi ............. G11C 5/025 |
| | | | 257/E27.088 |
| 9,052,768 | B2 * | 6/2015 | Kurasawa ............. G06F 3/0412 |
| 9,330,628 | B2 | 5/2016 | Hu et al. |
| 9,390,675 | B2 | 7/2016 | Chung et al. |
| 9,830,029 | B2 * | 11/2017 | Wang ................... H05K 1/0296 |
| 2007/0126802 | A1 * | 6/2007 | Shingyohuchi ...... B41J 2/14274 |
| | | | 347/68 |

(Continued)

FOREIGN PATENT DOCUMENTS

| CN | 104407728 A | 3/2015 |
| KR | 20050061214 A | 6/2005 |
| KR | 20150015273 A | 2/2015 |

*Primary Examiner* — Prabodh M Dharia
(74) *Attorney, Agent, or Firm* — Andrew C. Cheng

(57) ABSTRACT

Disclosed are a touch display panel, a driving circuit and a driving method of a touch display panel. The touch display panel includes a common electrode layer which used for display. The common electrode layer is also used as a touch detection electrode layer for touch detection. The common electrode layer is divided into a number of regions, which are respectively connected to the same number of selectors that are each connected to each of the same number of common voltage generating circuits to receive the same number of common voltages and selectively transmit the common voltages to the plurality of regions.

12 Claims, 3 Drawing Sheets

(56) References Cited

U.S. PATENT DOCUMENTS

| | | | |
|---|---|---|---|
| 2011/0157130 A1* | 6/2011 | Yasue | G09G 3/2077 |
| | | | 345/211 |
| 2012/0313881 A1 | 12/2012 | Zhi Bing et al. | |
| 2014/0043274 A1* | 2/2014 | Yao | G06F 3/044 |
| | | | 345/173 |
| 2015/0015469 A1 | 1/2015 | Dong et al. | |
| 2015/0185902 A1* | 7/2015 | Liu | G06F 3/044 |
| | | | 345/174 |
| 2016/0147348 A1* | 5/2016 | Liu | G06F 3/0412 |
| | | | 345/173 |
| 2016/0291777 A1* | 10/2016 | Xi | G06F 3/0416 |
| 2016/0328075 A1 | 11/2016 | Sijian et al. | |
| 2016/0351141 A1* | 12/2016 | Liu | G09G 3/3648 |
| 2017/0192277 A1* | 7/2017 | Gong | G02F 1/13394 |
| 2017/0315395 A1* | 11/2017 | Yeh | G02F 1/13338 |
| 2017/0357369 A1* | 12/2017 | Liu | G06F 3/044 |

* cited by examiner

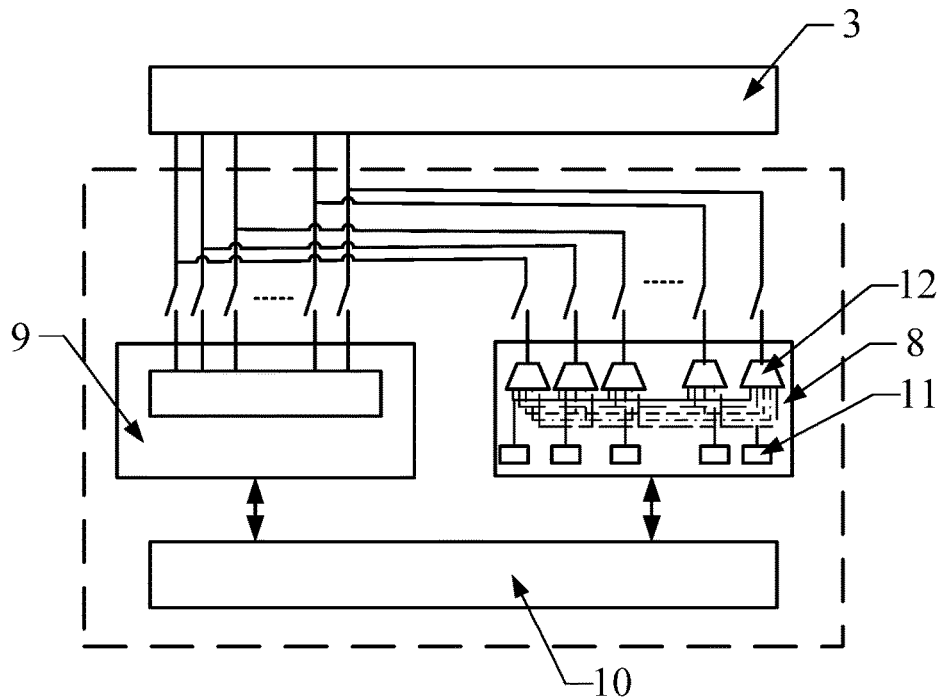

FIG 5

| When said touch display panel scans, said display control circuit works, each region of said common electrode layer is respectively driven by the independent common voltage provided by each common voltage generating circuit in said display control circuit. | S101 |

↕

| When said touch display panel scans, said common electrode layer is used for touch detection electrode layer which is used for touch detection, each electrode of said touch detection electrode layer is provided an independent touch detection signal by the touch control circuit. | S102 |

FIG 6

TOUCH DISPLAY PANEL, DRIVING CIRCUIT AND DRIVING METHOD OF TOUCH DISPLAY PANEL

BACKGROUND OF THE DISCLOSURE

1. Field of the Disclosure

The present disclosure relates to a touch display technical field, and in particular to a touch display panel, a driving circuit and a driving method of a touch display panel.

2. The Related Arts

The development of intelligent terminals enhances the development of integration of the liquid crystal display and touch function, combining the touch function and the liquid crystal display to form a touch display screen has become the development trend of the liquid crystal display, for the structural relationship between the touch screen and the liquid crystal display screen, from the initial separation of OGS technology to the on-cell technology which is to provide a touch screen on the liquid crystal of the liquid crystal display, and further developed into in-cell technology which is to embed the touch screen in the liquid crystal pixel of the liquid crystal display panel, wherein the in-cell technology can achieve slim and lightweight, becoming the development trend of the touch display panel.

In the prior in-cell technology, when the tough display screen scans, each region exists a scanning delay, making the charging circumstance of the capacitor in each region different, thus making the optimum common voltage of each region different, however, the common electrode of the touch display panel in the prior in-cell technology is a complete common electrode layer, which can not solve the problem of the optimum common voltage of each region resulted by the difference of charging circumstance of each region of the touch display panel, affecting the display quality.

SUMMARY OF THE DISCLOSURE

The technical issue to be solved by the present disclosure is to improve the circumstance that the difference of the charging circumstance of the capacitor of each region caused by the scanning delay results the difference of the common voltage.

In view of this, the present disclosure provides a touch display panel, a driving circuit and a driving method of a touch display panel, which can improve the circumstance that the difference of the charging circumstance of the capacitor of each region caused by the scanning delay results the difference of the common voltage.

In order to solve the above technical issue, a technical solution provided by the present disclosure is: to provide a touch display panel, wherein said touch display panel comprises a first substrate and a second substrate, said second substrate being an array substrate; said touch display panel comprises a common electrode layer used to display, said common electrode layer being also used for touch detection electrode layer which is used for touch detection, said common electrode layer being divided into a plurality of regions, each region corresponding to an independent common voltage;

said common electrode layer being provided on said second substrate or first substrate;

said common electrode layer having a plurality of common electrodes arranged in array, said common electrode being simultaneously used for touch detection electrode layer which is used for touch detection.

Wherein said common electrode is adjusted through a driving IC of said touch display panel.

In order to solve the above technical issue, another technical solution provided by the present disclosure is: to provide a driving circuit of a touch display panel, said driving circuit comprises a display control circuit, said display control circuit comprises a plurality of common voltage generating circuits, output ends of said plurality of common voltage generating circuits being respectively connected with a relative region of said common electrode layer of said touch display panel through a selector, said common electrode layer being divided into a plurality of regions;

wherein said common electrode being simultaneously used for touch detection electrode layer which is used for touch detection.

Wherein the amount of said selector is the same as the amount of said common voltage generating circuit.

Wherein said common voltage outputted by said selector is corresponded to the configuration bits of said common voltage; the digit of the configuration bits of said common voltage of said selector is provided according to the amount of said common voltage generating circuit.

Wherein said driving circuit also comprises a touch control circuit and a main control circuit, said main control circuit being respectively connected with said touch control circuit and said display control circuit, said touch control circuit and said display control circuit being connected with said touch display panel.

In order to solve the above technical issue, the other technical solution provided by the present disclosure is: to provide a driving method of a touch display panel, said touch display panel comprises a common electrode layer used to display, said common electrode layer being also used for touch detection electrode layer which is used for touch detection, said common electrode layer being divided into a plurality of regions, each region corresponding to an independent common voltage; said display control circuit of said touch display panel comprises a plurality of independent common voltage generating circuits, output ends of said plurality of common voltage generating circuits being respectively connected with a relative region of said common electrode layer of said touch display panel through a selector;

said driving method comprising: when said touch display panel scanning, said display control circuit working, each region of said common electrode layer being respectively driven by said independent common voltage provided by each common voltage generating circuit of said display control circuit.

Wherein when said touch display panel touch detection scans, said common electrode layer is used for a touch detection electrode layer which is used for touch detection, each electrode of said touch detection electrode layer is provided a independent touch detection signal by touch control circuit.

Wherein said common voltage outputted by said selector is corresponded to the configuration bits of said common voltage; the digit of the configuration bits of said common voltage of said selector is provided according to the amount of said common voltage generating circuit.

Wherein said touch display panel comprises a first substrate and a second substrate, said second substrate being an array substrate, said common electrode layer being provided on said second substrate or said first substrate.

Wherein said common electrode layer having a plurality of common electrodes arranged in array, said common electrode being simultaneously used for touch detection electrode layer which is used for touch detection.

Wherein said common electrode is adjusted through a driving IC of said touch display panel.

The embodiments of present disclosure provide a touch display panel, a driving circuit and a driving method of a touch display panel; the touch display panel of the embodiments of the present disclosure comprises a common electrode layer which used for display, said common electrode layer is simultaneously used for touch detection electrode layer which is used for touch detection, said common electrode layer is divided into a plurality of regions, each region is corresponded to a independent common voltage, which can scan the delay of said touch display panel, each region of said common electrode layer is respectively driven by the independent common voltage, each region provide the corresponded common voltage according to the required optimum common voltage, which can improve the problem that the difference of the pixel capacitors in the pixel circuit results the difference of the common voltage of each pixel region, improving the display quality.

BRIEF DESCRIPTION OF THE DRAWINGS

FIG. 5 is a driving structure diagram of an embodiment of a touch display panel of the present disclosure;

FIG. 6 is a specific flow chart of an embodiment of a touch display panel of the present disclosure.

DETAILED DESCRIPTION OF THE PREFERRED EMBODIMENTS

Figures 1, 2:
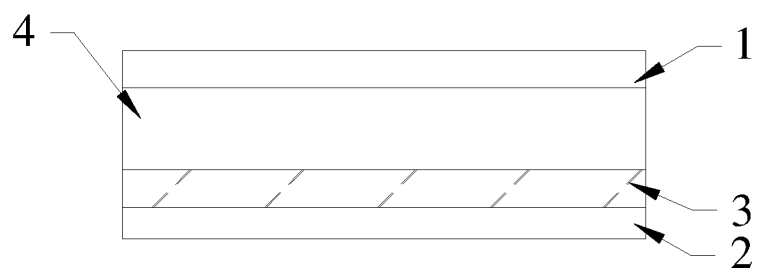
FIG. 1 is structure diagram of an embodiment of a touch display panel of the present disclosure.
FIG. 2 is a electrode arrangement schematic diagram of a common electrode layer of an embodiment of a touch display panel of the present disclosure.

In order to enable those skilled personnel to better understand the technical aspect of the present disclosure, the following will combine the drawings and the embodiments to describe the touch display panel, the driving circuit and the driving method of the touch display panel provided by the present disclosure in detail. In the drawings, in order to more clearly describe the devices and structures, exaggerating the thickness of the layer and area of the region, the same reference numerals are used to represent the same elements throughout the specification and drawings.

FIG. 1 is structure diagram of an embodiment of a touch display panel of the present disclosure, as shown in FIG. 1, the embodiment of the touch display panel of the present disclosure comprises a common electrode layer 3 which is used for display, said common electrode layer 3 is simultaneously used for touch detection electrode layer 3 which is used for touch detection, said common electrode layer 3 is divided into a plurality of regions, each region is corresponded to an independent common voltage.

Figure 3:
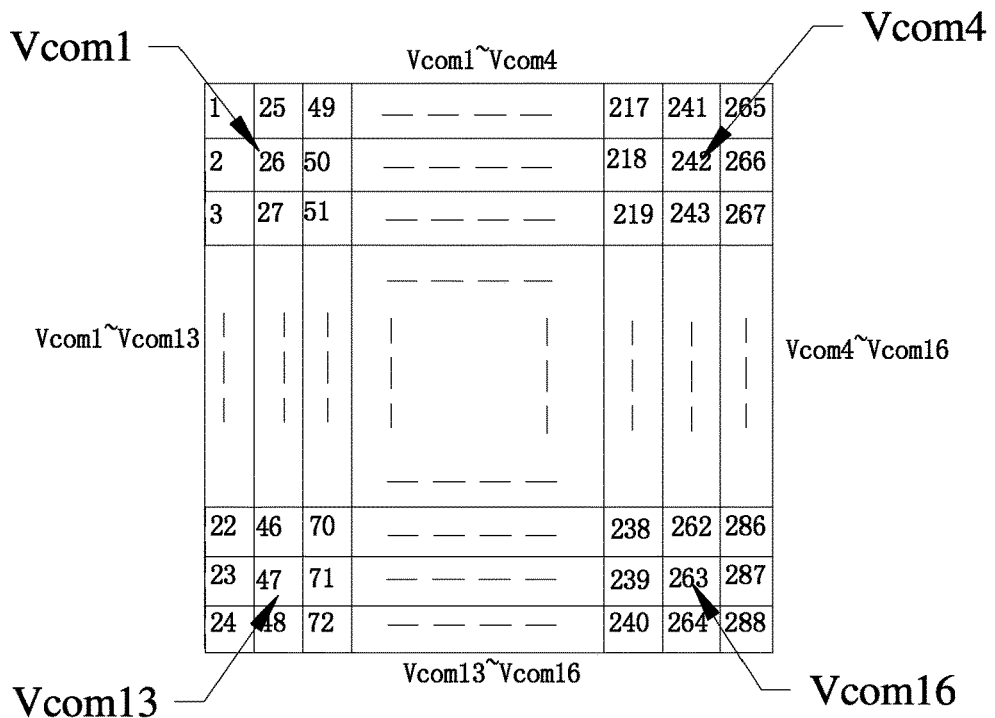
FIG. 3 is a regional division schematic diagram of a common electrode layer of an embodiment of a touch display panel of the present disclosure.

Specifically, said common electrode layer 3 having a plurality of common electrodes arranged in array, when the common electrode layer 3 is used for touch detection electrode layer 3 which is used for touch detection, each common electrode is touch detection electrode. Said touch detection electrode is arranged in a range of touch display screen, dividing said touch detection electrode layer 3 into a plurality of pieces according to the size of the touch display screen, the size of said plurality of pieces is not specifically limited by the present disclosure, optionally, the length and width of said plurality of pieces are 3 to 5 mm, said plurality of pieces comprise one or more touch detection electrodes. As shown in FIG. 2, the touch detection electrode layer 3 is divided into 12 aliquots in the lateral direction, 24 aliquots in the longitudinal direction, namely, dividing the touch detection layer 3 into 12×24 pieces, total is 288 pieces, each piece comprises one or more touch detection electrode, namely, each piece comprises one or more common electrode. According to the 288 pieces that the touch display electrode layer 3 is divided, the touch detection electrode layer 3 is further divided into 4×4 regions as shown in FIG. 3, total is 16 regions, when the touch display panel scans, each region is respectively corresponded to an independent common voltage, the common voltage of region can be the same, or can be different, or the common voltage of each region are partially the same.

The adjusting method of each common voltage is not specifically limited by the present disclosure, optionally, each common voltage is adjusted through the register configuration of the driving IC of tough display panel.

In the embodiments of the touch display panel of the present disclosure, the size of the plurality of pieces that the touch detect electrode layer 3 is divided is not less than 3×3 $mm^2$, and is not larger than 5×5 $mm^2$; wherein when the common electrode layer is divided into regions, it can be divided equally or not.

Wherein said touch display panel comprises a first substrate and a second substrate, said second substrate is an array substrate, said common electrode layer is provided on said second substrate or said first substrate.

Generally, the common electrode layer of the touch display panel is provided on the first substrate, when the touch display panel is required to be smaller, said common electrode layer can be provided on the second substrate; as shown in FIG. 1, said common electrode layer 3 is provided on the second substrate 2, further reducing the thickness of touch display panel, between said first substrate 1 and said second substrate 2 is a liquid crystal layer 4.

When the existing touch display panel scans, the scanning delay causes the charging circumstance of the capacitors of each region different, thereby resulting the optimum common voltage different, since the common electrode is a completed electrode layer, it only can provide one common voltage, it can not solve the problem of the optimum common voltage of each region resulted by the difference of charging circumstance of each region of the touch display panel, affecting the display quality.

The touch display panel of the embodiments of the present disclosure comprises a common electrode layer 3 which is used for display, said common electrode layer 3 is also used for touch detection electrode layer 3 which is used for touch detection, said common electrode layer 3 is divided into a plurality of regions, each region corresponds to an independent common voltage; when the touch display panel scans, each region can be corresponded to an independent common voltage, according to the charging circumstance of capacitors of each region on the touch display panel caused by the display scanning delay, adjusting the common voltage of each region through the register configuration of the driving IC, thereby improving the circumstance that the difference of the charging circumstance of the capacitor of each region on the touch display panel results the difference of the common voltage, improving the display quality of the touch display panel.

Figure 4:
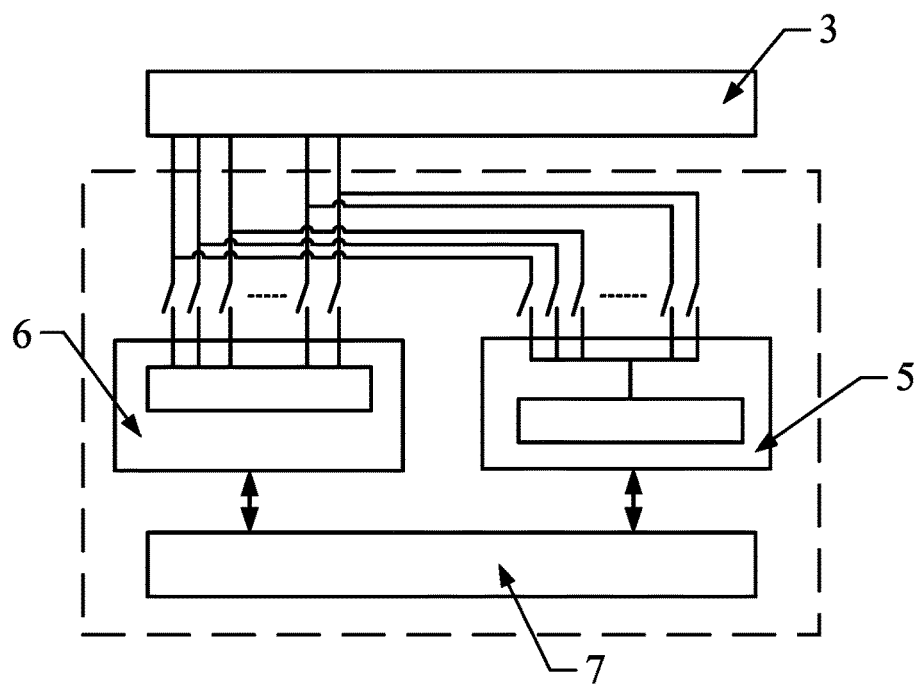
FIG. 4 is a driving structure diagram of a driving circuit of a touch display panel in prior art.

FIG. 4 is a driving structure diagram of a driving circuit of a touch display panel in prior art, as shown in FIG. 4, the driving structure of the common electrode layer 3 of the prior art comprises a touch control circuit 6, a display control circuit 5 and a main control circuit 7, said main control circuit 7 is respectively connected with the touch control circuit 6 and the display control circuit 5, the main control circuit 7 carries on the comprehensive driving control to said touch control circuit 6 and said display control circuit 5, meanwhile, there is only one common voltage generating circuit in the display control circuit 5. When the touch display panel scans, each region exists scanning delay, making the charging circumstance of capacitors of each region different, thereby resulting the difference of the optimum common voltage of each region, however, there is only one common voltage generating circuit in the existing display control circuit 5, it can only provide a unified common voltage, it can not solve the problem of the optimum common voltage of each region resulted by the difference of charging circumstance of each region of the touch display panel, affecting the display quality.

Refer to FIG. 5, FIG. 5 is a driving structure diagram of an embodiment of a touch display panel of the present disclosure, said driving circuit embodiment is corresponded to the touch display panel embodiment of the present disclosure.

As shown in FIG. 5, the embodiment of the driving circuit of the touch display panel of the present disclosure comprises a display control circuit 8, said display control circuit 8 comprises a plurality of independent common voltage generating circuit 11, the output ends of said plurality of common voltage generating circuit 11 are respectively connected with the corresponded region of the common electrode layer 3 in the touch display panel through a selector 12, said common electrode layer 3 is divided into a plurality of regions; wherein said common electrode layer 3 is simultaneously used for touch detection electrode layer 3 which is used for touch detection.

Wherein the amount of said common voltage generating circuit 11 is the same as the amount of the regions that said common electrode layer 3 is divided, the output end of each common voltage generating circuit 11 is respectively connected with the selector 12, each selector 12 is connected with a common voltage generating circuit 11 of which the amount is the same as the regions that said common electrode layer 3 is divided, the output end of each selector 12 is connected with the common electrode layer 3 of the touch display panel through the connection of channel, optionally, on the trace of connection of each selector 12 and the touch display panel is provided a switch.

Wherein the amount of said selector 12 in the embodiment of the driving circuit of the touch display panel of the present disclosure is the same as the amount of said common voltage generating circuit 11.

Wherein the common voltage outputted by said selector 12 is corresponded to said common voltage configuration bits; the common voltage configuration bits of the selector 12 in the embodiment of the driving circuit of the touch display panel of the present disclosure adopts binary.

Wherein the digit of the configuration bits of said common voltage of said selector 12 is provided according to the amount of said common voltage generating circuit 11.

Each selector 12 is connected with a common voltage generating circuit 11 of which the amount is the same as the regions that said common electrode layer 3 is divided, the output end of each selector 12 is connected with the common electrode layer 3 of the touch display panel through the connection of channel, when each selector 12 outputs common voltage, which selectively outputs a independent common voltage, thus providing a common voltage configuration bits to the common voltage outputted by each selector 12, namely, one common voltage configuration bits is corresponded to an independent common voltage. The digit of the configuration bits of said common voltage is provided according to the amount of amount of the regions divided by said common electrode layer 3, the more is the amount of regions divided by said common electrode layer 3, the more is the digit corresponded to the common voltage configuration bits.

Selecting the correspondingly outputted common voltage through adjusting the common voltage configuration bits of each selector 12, when the common voltage configuration bits of each selector 12 is different, the common voltage outputted by each selector 12 is different, the display control circuit 8 outputs a plurality of common voltages.

For example, according to FIG. 3, the embodiment of the touch display panel of the present disclosure divides the common electrode layer 3 into 16 regions, each region is corresponded to an independent common voltage, thus the display control circuit 8 of the touch display panel as shown in FIG. 3 comprises 16 common voltage generating circuits 11; making the common voltage correspondingly outputted by the 16 common voltage generating circuits 11 be Vcom1~Vcom16, in said display control circuit 8, the output end of each common voltage generating circuit 11 is connected with 16 selectors 12, the digit of the common voltage configuration bits of the selector 12 is required 4 bytes, providing the common voltage configuration bits of the selector 12 to 0000~1111, the common voltage configuration bits 0000~1111 of the selector 12 is respectively corresponded to the common voltage Vcom1~Vcom16 outputted by the selector 12, namely, if the common voltage configuration bits of the selector 12 is provided as 0000, the common voltage outputted by the selector 12 is Vcom1, if the common voltage configuration bits of the selector 12 is provided as 0001, the common voltage outputted by the selector 12 is Vcom2, and so on, until the common voltage configuration bits of the selector 12 is provided as 1111, the common voltage outputted by the selector 12 is Vcom16, thereby able to achieve that each selector 12 in the display control circuit 8 provides the independent common voltage to the corresponded region.

If said common electrode layer 3 does not need the plurality of common voltages, thus providing the same common voltage configuration bits for each selector 12 in the display control circuit 8, thus able to achieve that the display control circuit 8 provides the same common voltage for each region of the common electrode layer 3.

The digit of the common voltage configuration bits of the selector 12 in the embodiment of the driving circuit of the touch display panel of the present disclosure is changed according to amount of the regions that the common electrode layer 3 is divided; if the amount of the region that the common electrode 3 is divided is 4, thus the digit of the common voltage configure bits corresponded to the selector 12 is 2 bytes, if the amount of the regions that the common electrode layer 3 is divided is 8, thus the digit of the common voltage configuration bits corresponded to the selector 12 is 3 bytes.

Wherein said driving circuit also comprises a touch control circuit 9 and a main control circuit 10, said main control circuit 10 is respectively connected with said touch control circuit 9 and said display control circuit 8, said touch control circuit 9 and said display control circuit 8 are connected with said touch display panel.

When the touch display panel scans, the touch control circuit 9 works.

FIG. 6 is a specific flow chart of an embodiment of a touch display panel of the present disclosure, the embodiment of the driving method of the touch display panel of the present disclosure is corresponded to the embodiment of the touch display panel of the present disclosure described above and the embodiment of the driving circuit of the touch display panel of the present disclosure.

The embodiment of the touch display panel of the present disclosure comprises a common electrode layer 3 which is used for display, said common electrode layer 3 is also used for touch detection electrode layer 3 which is used for touch detection, said common electrode layer 3 is divided into a plurality of regions, each region is corresponded to an independent common voltage; said display control circuit 8 of said touch display panel comprises a plurality of common voltage generating circuits 11, output ends of said plurality of common voltage generating circuits 11 are respectively connected with a relative region of said common electrode layer 3 of said touch display panel through a selector 12.

Refer to FIG. 6, said driving method comprises:

Step S101, when said touch display panel scans, said display control circuit 8 works, each region of said common electrode layer 3 is respectively driven by the independent common voltage provided by each common voltage generating circuit 11 in said display control circuit 8.

Wherein the common voltage outputted by said selector 12 is corresponded to said common voltage configuration bits; the digit of the common voltage configuration bits of said selector 12 is provided according to the amount of said common voltage generating circuit 11.

The common electrode layer 3 of the touch display panel is divided into a plurality of regions, the output end of each selector 12 in the display control circuit 8 is corresponded to the region of the common voltage layer 3, meanwhile, the input end of each selector 12 is connected with the plurality of common voltage generating circuits 11; when the touch display panel scans, according to the charging circumstance of the capacitor of each region, the driving IC provides a corresponded common voltage configuration bits for the selector 12 in the display control circuit 8, the selector 12 provides an independent common voltage for the region of the corresponded common electrode layer 3, the common voltage is corresponded to the common voltage configuration bits of the selector 12, namely, achieving that when the touch display panel scans, according to the charging circumstance of the capacitor of each region on the touch display panel caused by the delay of the display scan, providing the independent common voltage for each region of the common electrode layer 3, thereby improving the circumstance of the optimum common voltage of each region resulted by the difference of charging circumstance of each region of the touch display panel, improving the display quality of the touch display panel.

Step S102, when said touch display panel scans, said common electrode layer 3 is used for touch detection electrode layer 3 which is used for touch detection, each electrode of said touch detection electrode layer 3 is provided an independent touch detection signal by the touch control circuit 9.

Step S101 and S102 are chosen according to the operation state of said touch display panel, there is no particular order.

The other embodiment of the present disclosure provides a touch display device, said touch display device comprises a touch display panel, said touch display panel comprises a common electrode layer which is used for display, said common electrode layer is also used for touch detection electrode layer which is used for touch detection, said common electrode layer is divided into a plurality of regions, each region corresponds to an independent common voltage.

Wherein said touch display panel comprises a first substrate and a second substrate, said second substrate is an array substrate, said common electrode layer is provided on said second substrate or said first substrate.

The technical solution of the present disclosure use the common electrode 3 which is used for display in the touch display panel for touch detection electrode layer 3 which is used for touch detection when the touch display panel scans, said common electrode layer 3 is divided into a plurality of regions, each region corresponds to an independent common voltage; when the touch display panel scans, each region of said common electrode layer 3 is respectively driven by the independent common voltage, each region provides the corresponded common voltage according to the charging circumstance of the capacitor thereof, which can improve the circumstance that the difference of the charging circumstance of the capacitor of each region caused by the scanning delay results the difference of the common voltage, improving the display quality.

The preferred embodiments according to the present disclosure are mentioned above, which cannot be used to define the scope of the right of the present disclosure. Those variations of equivalent structure or equivalent process according to the present specification and the drawings or directly or indirectly applied in other areas of technology are considered encompassed in the scope of protection defined by the claims of the present disclosure.

What is claimed is:

1. A touch display panel, comprising a first substrate and a second substrate, said second substrate being an array substrate; wherein the touch display panel comprises a common electrode layer used to display, the common electrode layer being also used as a touch detection electrode layer for touch detection, the common electrode layer being divided into a number of regions, which respectively receives different common voltages that are supplied from separate common voltage sources of a display control circuit through selectors to the number of regions;

wherein the common electrode layer is provided on the second substrate or the first substrate;

wherein the common electrode layer comprises a plurality of common electrodes arranged in an array, the common electrodes being also used as touch detection electrodes of the touch detection electrode layer;

wherein the number of regions of the common electrode layer are connected, in parallel, to the display control circuit and are connected through the selectors to the common voltage sources; and wherein the number of regions are respectively connected to the selectors and the selectors are each connected to each of the common voltage sources such that each of the selectors receives the common voltages supplied from the common voltage sources.

2. The touch display panel as claimed in claim 1, wherein the common voltages are controlled by a driving IC of the touch display panel.

3. A driving circuit of a touch display panel, wherein said driving circuit comprises a display control circuit, which comprises a plurality of common voltage generating circuits that are independent of each other and generate different common voltages, each of the common voltage generating circuits having an output end, the output ends of said plurality of common voltage generating circuits being connected with each of a number of regions of a common electrode layer of the touch display panel through a selector, the number of regions of the common electrode layer being separate from each other;

wherein said common electrode layer is also used as a touch detection electrode layer for touch detection;

wherein the number of regions of the common electrode layer are connected, in parallel, to the display control circuit and are connected through the selectors to the common voltage generating circuits; and wherein the number of regions are respectively connected to the selectors and the selectors are each connected to each of the common voltage generating circuits such that each of the selectors receives the common voltages supplied from the common voltage generating circuits.

4. The driving circuit as claimed in claim 3, wherein the plurality of common voltage generating circuits each correspond to one of the selectors such that the common voltage generating circuits and the selectors correspond, in number, to each other.

5. The driving circuit as claimed in claim 3, wherein said common voltage outputted by said selector is corresponded to the configuration bits of said common voltage; the digit of the configuration bits of said common voltage of said selector is provided according to the amount of said common voltage generating circuit.

6. The driving circuit as claimed in claim 3, wherein said driving circuit also comprises a touch control circuit and a main control circuit, said main control circuit being respectively connected with said touch control circuit and said display control circuit, said touch control circuit and said display control circuit being connected with said touch display panel.

7. A driving method of a touch display panel, wherein said touch display panel comprises a common electrode layer used to display, said common electrode layer being also used as a touch detection electrode layer for touch detection, said common electrode layer being divided into a number of regions, which are respectively supplied with different common voltages from a number of common voltage generating circuits of a display control circuit of the touch display panel, an output end of each of the plurality of common voltage generating circuits being connected with one of the regions of the common electrode layer through a selector;

wherein the number of regions of the common electrode layer are connected, in parallel, to the display control circuit and are connected through the selectors to the common voltage generating circuits;

wherein the number of regions are respectively connected to the selectors and the selectors are each connected to each of the common voltage generating circuits such that each of the selectors receives the common voltages supplied from the common voltage generating circuits;

said driving method comprising: when said touch display panel scans, said display control circuit is put into operation, each of the regions of the common electrode layer being driven by a respective one of the common voltages provided by the common voltage generating circuits of said display control circuit.

8. The driving circuit as claimed in claim 7, wherein when said touch display panel touch detection scans, said common electrode layer is used for a touch detection electrode layer which is used for touch detection, each electrode of said touch detection electrode layer is provided a independent touch detection signal by touch control circuit.

9. The driving circuit as claimed in claim 7, wherein said common voltage outputted by said selector is corresponded to the configuration bits of said common voltage; the digit of the configuration bits of said common voltage of said selector is provided according to the amount of said common voltage generating circuit.

10. The driving circuit as claimed in claim 7, wherein said touch display panel comprises a first substrate and a second substrate, said second substrate being an array substrate, said common electrode layer being provided on said second substrate or said first substrate.

11. The driving circuit as claimed in claim 10, wherein said common electrode layer having a plurality of common electrodes arranged in an array, said common electrode layer being also used as a touch detection electrode layer for touch detection.

12. The driving circuit as claimed in claim 10, wherein the common voltages are controlled by a driving IC of said touch display panel.

\* \* \* \* \*